US008022996B2

(12) United States Patent

Pasolini et al.

(10) Patent No.: US 8,022,996 B2
(45) Date of Patent: Sep. 20, 2011

(54) IMAGE STABILIZING DEVICE OF THE MEMS TYPE, IN PARTICULAR FOR IMAGE ACQUISITION USING A DIGITAL-IMAGE SENSOR

(75) Inventors: Fabio Pasolini, S. Martino Siccomario (IT); Luca Fontanella, Cusago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 766 days.

(21) Appl. No.: 12/048,756

(22) Filed: Mar. 14, 2008

(65) Prior Publication Data

US 2008/0158370 A1 Jul. 3, 2008

Related U.S. Application Data

(63) Continuation-in-part of application No. PCT/EP2006/066387, filed on Sep. 14, 2006.

(30) Foreign Application Priority Data

Sep. 15, 2005 (IT) ......................... TO2005A 000628

(51) Int. Cl.
*H04N 5/228* (2006.01)

(52) U.S. Cl. ....................................... 348/208.2; 396/52

(58) Field of Classification Search ............... 348/208.99–208.16; 73/510, 512, 73/514.02, 514.32, 514.36, 514.01; 396/52–55
See application file for complete search history.

(56) References Cited

U.S. PATENT DOCUMENTS

| | | | | |
|---|---|---|---|---|
| 4,448,510 | A | 5/1984 | Murakoshi | |
| 5,635,739 | A * | 6/1997 | Grieff et al. | 257/254 |
| 5,905,203 | A * | 5/1999 | Flach et al. | 73/514.32 |
| 6,992,700 | B1 | 1/2006 | Sato et al. | |
| 7,430,366 | B2 * | 9/2008 | Togawa | 396/53 |
| 2005/0000286 | A1 * | 1/2005 | Campbell et al. | 73/510 |
| 2005/0179784 | A1 | 8/2005 | Qi | |
| 2005/0285948 | A1 * | 12/2005 | Weinberg | 348/208.99 |
| 2007/0002015 | A1 * | 1/2007 | Mohri et al. | 345/157 |

FOREIGN PATENT DOCUMENTS

| | | | |
|---|---|---|---|
| JP | 2005003719 | A * | 1/2005 |
| WO | 90/09077 | | 8/1990 |

OTHER PUBLICATIONS

Lacquet et al., "A CMOS Compatible Micromachined Yaw-rate Sensor," IEEE International Symposium on Industrial Electronics, Jul. 7, 1998, pp. 327-329.

* cited by examiner

*Primary Examiner* — Nelson D. Hernández Hernández
(74) *Attorney, Agent, or Firm* — Lisa K. Jorgenson; Robert Iannucci; Seed IP Law Group PLLC

(57) ABSTRACT

A device for stabilizing images acquired by a digital-image sensor includes a motion-sensing device, for detecting quantities correlated to pitch and yaw movements of the digital-image sensor, and a processing unit, connectable to the digital-image sensor for receiving a first image signal and configured for extracting a second image signal from the first image signal on the basis of the quantities detected by the motion-sensing device. The motion-sensing device includes a first accelerometer and a second accelerometer.

22 Claims, 5 Drawing Sheets

IMAGE STABILIZING DEVICE OF THE MEMS TYPE, IN PARTICULAR FOR IMAGE ACQUISITION USING A DIGITAL-IMAGE SENSOR

CROSS-REFERENCE TO RELATED APPLICATION

This application is a continuation-in-part of International Patent Application No. PCT/EP2006/066387, filed Sep. 14, 2006, now pending, which application is incorporated herein by reference in its entirety.

This application claims the benefit under 35 U.S.C. §119 (a) of Italian Patent Application No. TO2005A 000628, filed Sep. 15, 2005, which is incorporated herein by reference in its entirety.

BACKGROUND

1. Technical Field

The present invention relates to an image stabilizing device, in particular for image acquisition using a digital-image sensor.

2. Description of the Related Art

As is known, shots taken using non-professional portable apparatuses, such as camcorders or digital cameras, either stand-alone or incorporated in telephone apparatuses, suffer from flickering caused by minor movements of the operator. In particular, portable apparatuses are supported only by the hands of the operator, and the lack of a firm point of rest makes it practically impossible to keep the framing stable. The resulting image is hence unstable and consequently unpleasant to the eye. The same problem also regards cameras during the acquisition of single images. A movement can render acquisition imprecise, especially for long exposure times.

The use of image stabilizers has thus been proposed. By appropriate processing, in digital apparatuses it is possible "to cut out" a portion (hereinafter referred to as "usable frame") of the image effectively acquired (hereinafter referred to as "complete image"). Only the usable frame is made available for display, whereas an outer frame is eliminated from the complete image. Stabilizer devices enable estimation of the movements of the equipment and recalculation of the co-ordinates of the usable frame so as to compensate for the movements and render the image stable.

Image stabilizers of a first type are based upon the content of the images to be stabilized. After identification of reference elements in a scene, in practice the displacement of the apparatus and the position of the usable frame are estimated by comparing the positions of the reference elements in successive frames. Systems of this type are not satisfactory when the scene framed contains elements that are effectively moving, such as, for example, a person who is walking.

According to a different solution, image stabilizers include gyroscopes, which measure angular velocity of the apparatus with respect to axes transverse to an optical axis thereof (normally, two axes perpendicular to one another and to the optical axis). The rotations about said axes cause in fact the greatest disturbance. By means of temporal integration of the data detected by the gyroscopes, it is possible to trace back to the instantaneous angular position of the optical axis of the apparatus and from here to the position of the centre of the usable frame. The image can then be corrected accordingly. In this way, the stabilization of the image is independent of its content. Gyroscopes, however, absorb a lot of power, because they use a mass that must be kept constantly in oscillatory or rotational motion. Their use is hence disadvantageous in devices that are supplied autonomously because they markedly limit the autonomy thereof.

BRIEF SUMMARY

One embodiment of the present invention provides an image stabilizer device that is free from of the above referred drawbacks.

A stabilizer device of images acquired by a digital-image sensor device is provided, as defined in claim 1.

BRIEF DESCRIPTION OF THE SEVERAL VIEWS OF THE DRAWINGS

For a better understanding of the invention, an embodiment thereof is now described purely by way of non-limiting example and with reference to the attached drawings, wherein.

DETAILED DESCRIPTION

Figure 1:
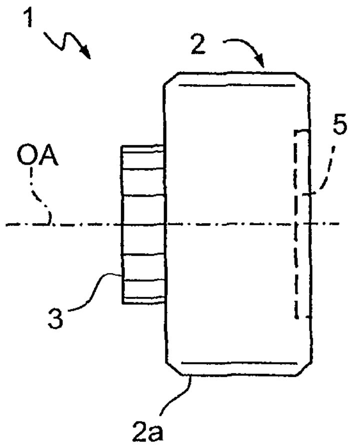
FIG. 1 is a right side view of a digital camera in a first operating configuration.
Figure 2:
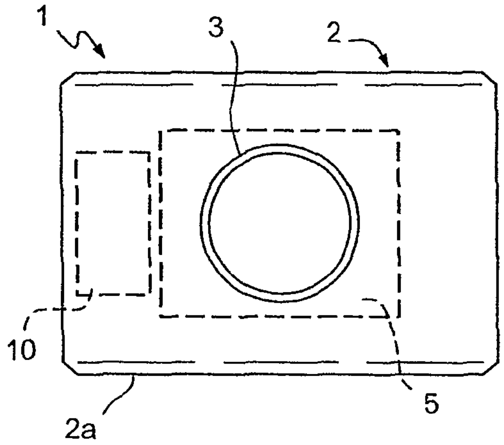
FIG. 2 is a front view of the camera of FIG. 1.
Figure 3:
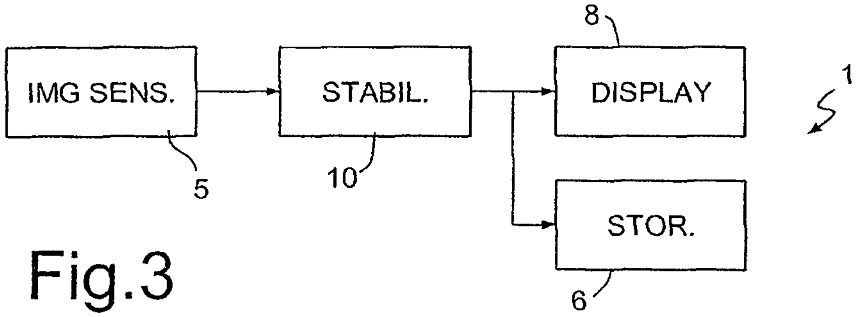
FIG. 3 is a simplified block diagram of the camera of FIG. 1.

With reference to FIGS. 1-3, a digital camera 1, adapted for shooting digital films, comprises a body 2, a lens 3, a digital-image sensor 5, a non-volatile storage unit 6, a display 8, and an image stabilizer device 10.

The body 2 comprises a base 2*a*, normally facing downwards, and houses inside it the image sensor 5, the storage unit 6, and the image stabilizer device 10.

Figure 4A:
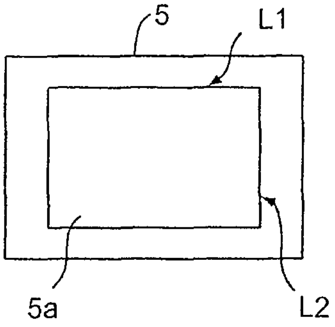
FIGS. 4*a*-4*c* are front views of an image sensor incorporated in the camera of FIGS. 1 and 2, in different operating configurations.
Figure 4B:
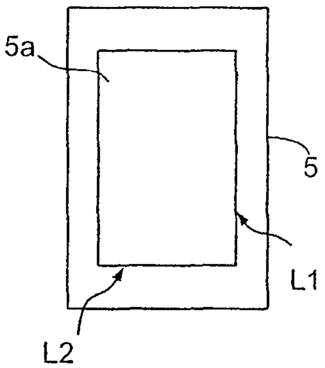

The image sensor 5 is, for example, a CCD or CMOS sensor and is arranged perpendicular to an optical axis OA of the lens 3. Furthermore, the optical axis OA intercepts the centre of the image sensor 5. Note that a sensitive portion 5*a* of the image sensor 5 has a rectangular shape (see FIGS. 4*a* and 4*b*) and, during use of the camera 1, is normally arranged in a "landscape" configuration or in a "portrait" configuration. More precisely, in the "landscape" configuration (FIG. 4*a*), the larger sides L1 of the sensitive portion 5*a* are substantially horizontal and the smaller sides L2 are frequently, but not necessarily, vertical; in the "portrait" configuration (FIG. 4*b*), the smaller sides L2 are substantially horizontal and the larger sides L1 are frequently, but not necessarily, vertical. With reference to the orientation of the larger sides L1 and of the smaller sides L2 of the sensitive portion 5*a* of the sensor 5, by "yaw" movements (and angles) are meant rotations (and angles) of the optical axis OA with respect to a yaw axis parallel to those sides, between the larger sides L1 and the smaller sides L2, which are less inclined with respect to the vertical. In particular, in the "landscape" configuration, a yaw movement is a rotation of the optical axis about a yaw axis parallel to the smaller sides L2; in the "portrait" configuration, instead, the yaw axis is parallel to the larger sides L1. By "pitch" movements (and angles) are meant rotations of the optical axis OA about a pitch axis perpendicular to the yaw axis (and to the optical axis OA itself). Consequently, in the "landscape" configuration, the pitch axis is parallel to the larger sides L1, whereas in the "portrait" configuration the pitch axis is parallel to the smaller sides L2.

Figure 4C:
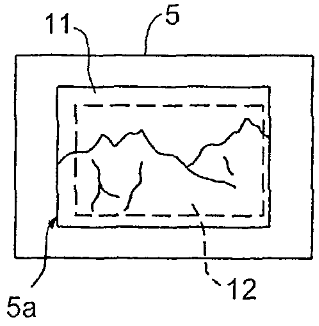

With reference to FIGS. 3 and 4*c*, the stabilizer device 10 receives from the image sensor 5 a first image signal IMG regarding a complete image 11 detected by the image sensor 5 itself, and generates a second image signal IMG' regarding a usable frame 12 obtained from the complete image 11 and stabilized. The second image signal IMG' is supplied to the storage unit 6 and to the display 8.

Figure 5:
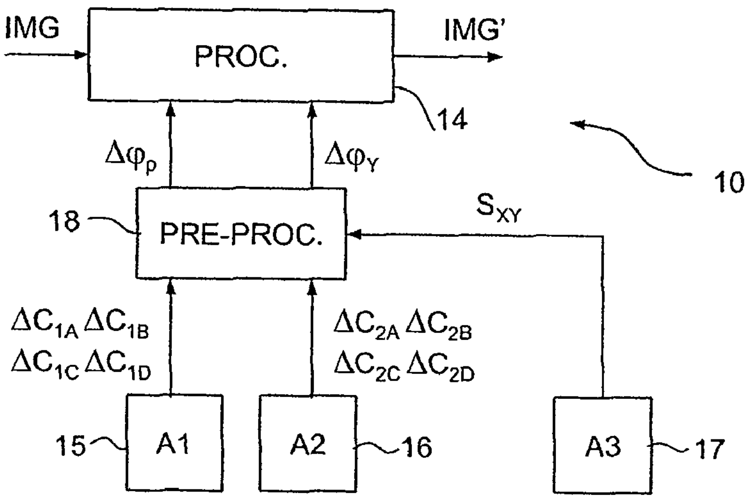
FIG. 5 is a block diagram of a, image stabilizer device according to the present invention, incorporated in the camera of FIG. 1.
Figure 6A:
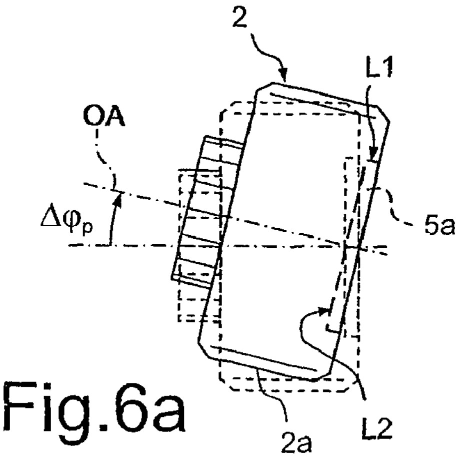
FIG. 6*a* is a right view of the camera of FIG. 1 and shows a movement of pitch in the first operating configuration.
Figure 6B:
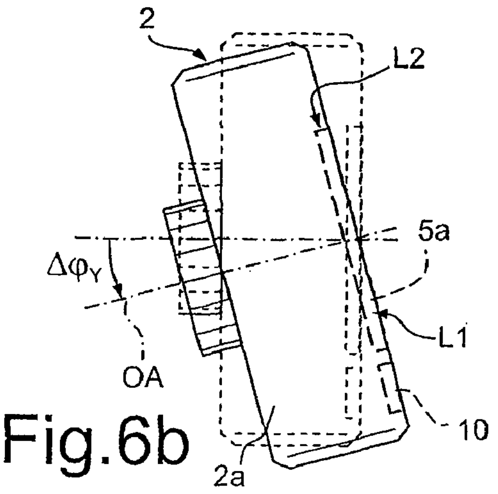
FIG. 6*b* is a bottom view of the camera of FIG. 1 and shows a movement of yaw in the operating configuration of FIG. 6*a;*
Figure 6C:
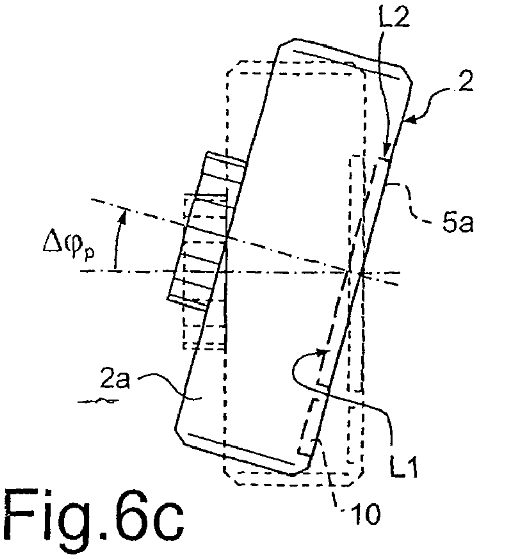
FIG. 6*c* is a right view of the camera of FIG. 1 and shows a movement of pitch in a second operating configuration, in which the camera is rotated substantially through 90° about a horizontal axis with respect to the first operating configuration.
Figure 6D:
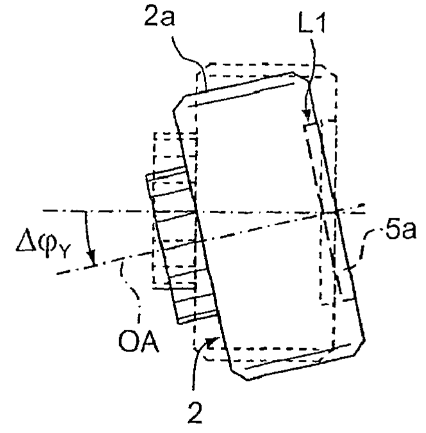
FIG. 6*d* is a bottom view of the camera in the second operating configuration of FIG. 6*c* and shows a movement of yaw in the second operating configuration.
Figure 13:
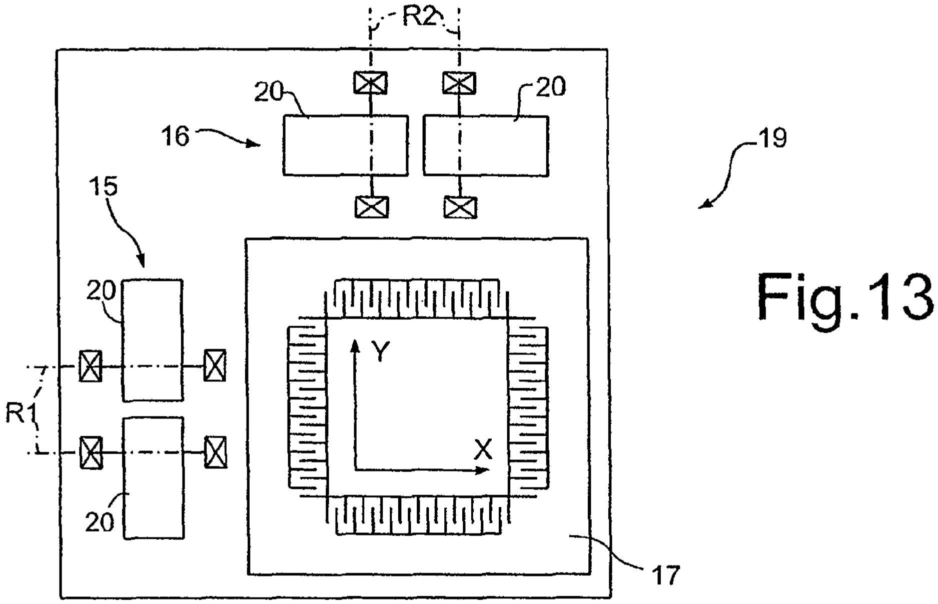
FIG. 13 is a front view of the semiconductor chip of FIGS. 7, 8, 10 and 11, in the first operating configuration.
Figure 15:
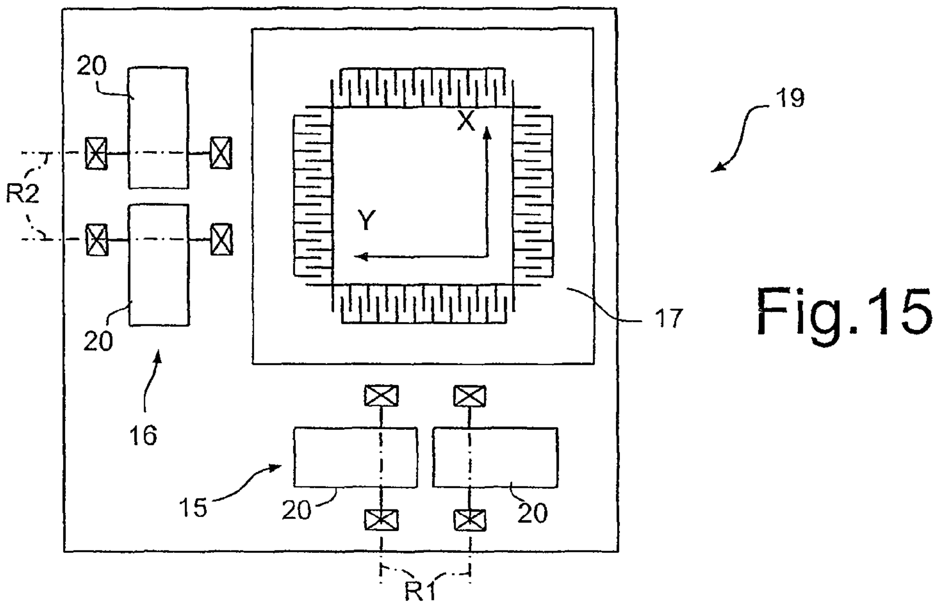
FIG. 15 is a front view of the semiconductor chip of FIGS. 7, 8, 10, 11 and 13, in the second operating configuration.

As illustrated in FIG. 5, the stabilizer device 10 comprises a processing unit 14, a first accelerometer 15, a second accelerometer 16, and a third accelerometer 17, all of a microelectromechanical type and preferably integrated in a single semiconductor chip 19 (see also FIGS. 13 and 15). Furthermore, the stabilizer device 10 includes a pre-processing stage 18, which supplies variations of a pitch angle $\Delta\phi_P$ and variations of a yaw angle $\Delta\phi_Y$ (FIGS. 6*a*, 6*b*, which refer to the "landscape" configuration, and FIGS. 6*c*, 6*d*, which refer to the "portrait" configuration, in which the base 2*a* of the body 2 is facing sideways and not downwards; for reasons of simplicity, FIGS. 6*a*-6*d* show only the sensitive portion 5*a* of the image sensor 5 and, moreover, in FIG. 6*d* the stabilizer device 10 is not illustrated) on the basis of signals detected by the first, second, and third accelerometers 15, 16, 17.

The processing unit 14 receives the first image signal IMG and extracts the second image signal IMG' therefrom, using the variations of the pitch angle $\Delta\phi_P$ and the variations of the yaw angle $\Delta\phi_Y$. In practice, the processing unit 14 is configured for determining displacements of the body 2 and of the optical axis OA on the basis of the variations of the pitch angle $\Delta\phi_P$ and the variations of the yaw angle $\Delta\phi_Y$, for positioning the usable frame 12 within the complete image 11, so as to compensate for the detected displacements of the body 2 and of the optical axis OA, and for generating the second signal image IMG' on the basis of the portion of the complete image 11 corresponding to the usable frame 12.

Figure 7:
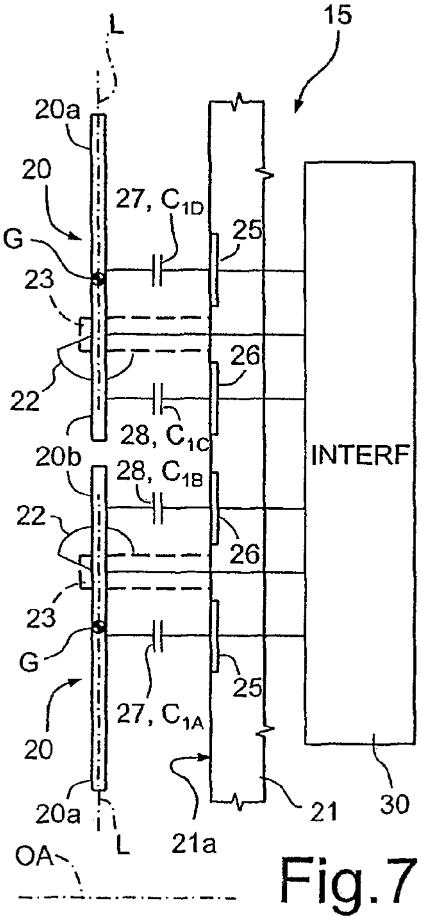
FIG. 7 is a cross-sectional view through a first portion of a semiconductor chip incorporating the image stabilizer device of FIG. 5, taken along line VII-VII of FIG. 8.
Figure 8:
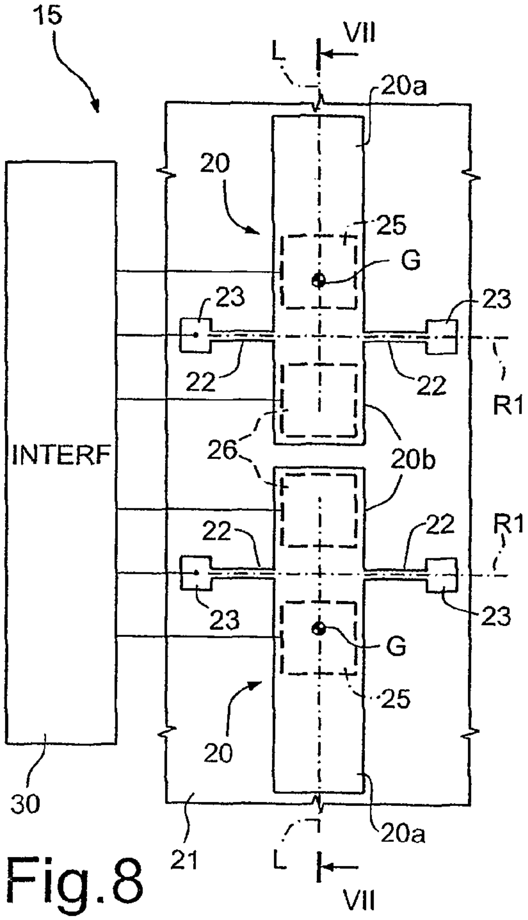
FIG. 8 is a front view of the first portion of the semiconductor chip of FIG. 7.

As illustrated in FIGS. 7 and 8, the first accelerometer 15 has a specularly symmetrical oscillating-beam structure. In greater detail, the first accelerometer 15 comprises two beams 20 of semiconductor material, constrained to a substrate 21 of the semiconductor chip 19 by return torsional springs 22, fixed to respective anchorages 23. The torsional springs 22 are shaped so that the beams 20 are free to oscillate about respective first rotation axes R1 in response to external stresses. In particular, the first rotation axes R1 are parallel to one another and to the surface 21*a* of the substrate 21, and perpendicular to longitudinal axes L of the beams 20 themselves and to the optical axis OA. The longitudinal axes L of the beams 20 are mutually aligned at rest. The first axes of rotation R1 intercept the longitudinal axes L in points staggered with respect to the centroids G of the respective beams 20, dividing each of them into a larger portion 20*a*, containing the respective centroid G, and into a smaller portion 20*b*.

At rest, the beams 20 are arranged in a specularly symmetrical way with respect to one another. In the embodiment of the invention described herein, the beams 20 have their respective smaller portions 20*b* facing one another, whereas the larger portions 20*a* project outwards in opposite directions. In the absence of external stresses, moreover, the torsional springs 22 tend to keep the beams 20 parallel to the surface 21*a* of the substrate 21.

A first electrode 25 and a second electrode 26 are associated to each beam 20, and are housed in the substrate 21 (insulated therefrom) in positions that are symmetrical with respect to the respective first axes of rotation R1. The larger portion 20*a* and the smaller portion 20*b* of each beam 20 are capacitively coupled with the respective first electrode 25 and the respective second electrode 26 and form first and second capacitors 27, 28, having variable capacitance. In this way, a rotation of a beam 20 about the respective first rotation axis R1 causes a corresponding differential capacitive unbalancing between the first capacitor 27 and the second capacitor 28 associated thereto. In FIGS. 7 and 8, the capacitances of the first capacitors 27 are designated by $C_{1A}$ and $C_{1C}$, respectively, whereas the capacitances of the second capacitors 28 are designated by $C_{1B}$ and $C_{1D}$, respectively.

Figure 9:
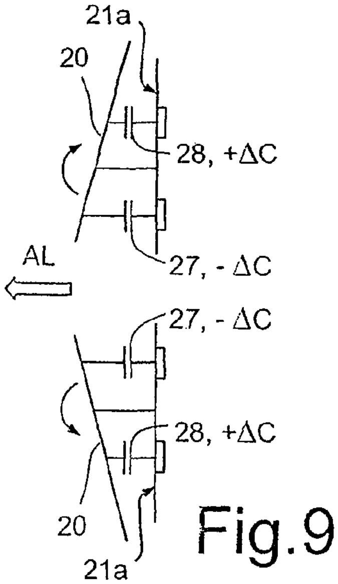
FIGS. 9 and 10 schematically show the responses of a component incorporated in the image stabilizer device of FIG. 5 to linear and, respectively, angular accelerations.
Figure 10:
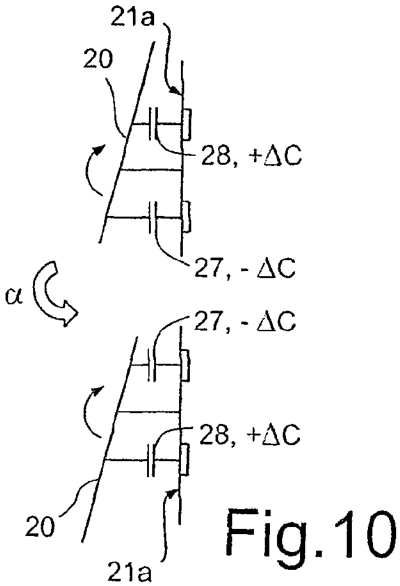

In the presence of linear accelerations AL having a component perpendicular to the surface 21*a* of the substrate 21 (in practice, parallel to the optical axis OA), the two beams 20 are subject to rotations of equal amplitude, one in a clockwise direction and one in a counterclockwise direction (FIG. 9). Consequently, the capacitances of both of the first capacitors 27 increase (decrease) by an amount $+\Delta C$ ($-\Delta C$), whereas the capacitances of both of the second capacitors 28 decrease (increase) by an amount $-\Delta C$ ($+\Delta C$). The variations are hence of equal absolute value and of opposite sign. Instead, when the semiconductor chip 19 is subjected to a rotational acceleration $\alpha$, both of the beams 20 undergo rotations in the same direction, whether clockwise or counterclockwise (FIG. 10). Consequently, for one of the beams 20, the capacitance of the first capacitor 27 increases by an amount $+\Delta C$ and the capacitance of the second capacitor 28 decreases by an amount $-\Delta C$, while, on the contrary, for the other beam 20 the capacitance of the first capacitor 27 decreases by the amount $-\Delta C$, and the capacitance of the second capacitor 28 increases by the amount $+\Delta C$.

Capacitance variations $\Delta C_{1A}$, $\Delta C_{1B}$, $\Delta C_{1C}$, $\Delta C_{1D}$ are detectable by means of a sense interface 30 having terminals connected to the first electrodes 25, to the second electrodes 26, and to the beams 20 (through the substrate 21, the anchorages 23, and the torsional springs 22, made of semiconductor material).

Figure 11:
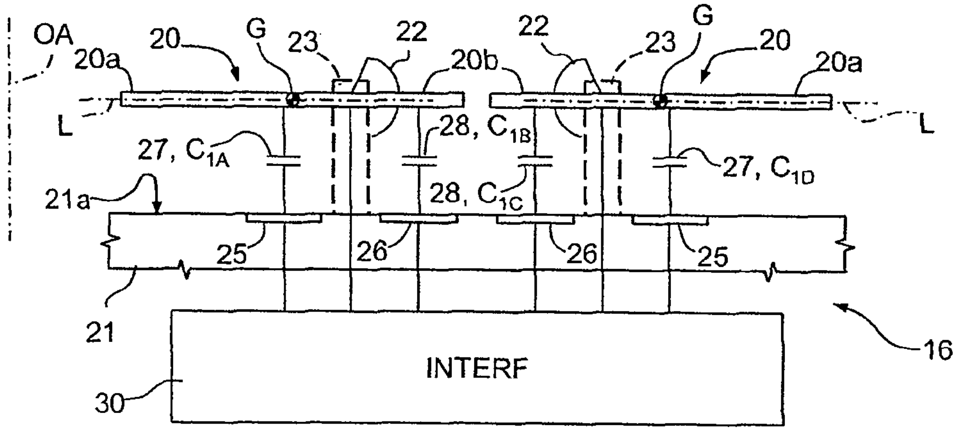
FIG. 11 shows a cross-section through a second portion of the semiconductor chip of FIGS. 7 and 8, taken along line XI-XI of FIG. 8.
Figure 12:
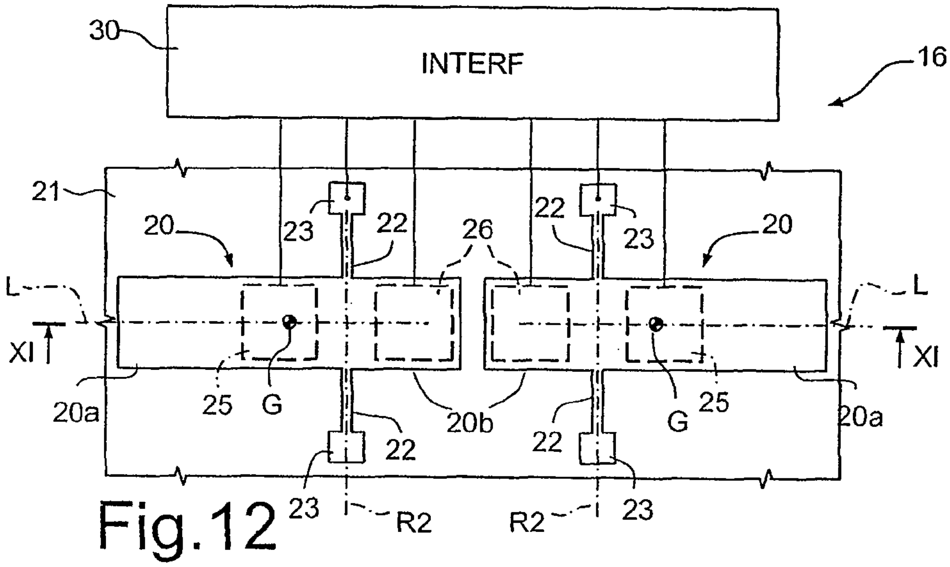
FIG. 12 is a front view of the second portion of the semiconductor chip of FIG. 11.

The second accelerometer 16 has a structure identical to the first accelerometer 15 and is rotated by 90° with respect thereto, as illustrated in FIGS. 11 and 12. More precisely, the beams 20 of the second accelerometer 16 are free to oscillate, in response to external stresses, about second rotation axes R2 parallel to one another and perpendicular to the first rotation axes R1 and to the optical axis OA. Also the second rotation axes R2 intercept the longitudinal axes L of the respective beams 20 in points staggered with respect to the centroids G. For the second accelerometer 16 (FIG. 11), the capacitances of the first capacitors 27 are designated by $C_{2A}$ and $C_{2C}$, whereas the capacitances of the second capacitors 28 are designated by $C_{2B}$ and $C_{2D}$; the corresponding capacitance variations are designated by $\Delta C_{2A}$, $\Delta C_{2B}$, $\Delta C_{2C}$, $\Delta C_{2D}$. The response of the second sensor 16 to linear accelerations AL, perpendicular to the second rotation axes R2 and to angular accelerations about axes parallel to the second rotation axes R2, is altogether similar to the response of the first accelerometer 15 to linear accelerations AL, perpendicular to the first rotation axes R1 and to angular accelerations about axes parallel to the first rotation axes R1 (as represented in FIGS. 9 and 10).

The semiconductor chip 19 is mounted in the body 2 of the camera 1 so that, in the absence of external stresses, the beams 20 of the first accelerometer 15 and of the second accelerometer 16 are perpendicular to the optical axis OA (FIG. 13). Furthermore, when the optical axis OA and the base 2*a* of the body 2 are horizontal, the first rotation axes R1 of the first accelerometer 15 are horizontal, whereas the second rotation axes R2 of the second accelerometer 16 are vertical.

The third accelerometer 17 (FIG. 13) is of a biaxial type with comb-fingered electrodes, as illustrated schematically in FIG. 13, and is a low-resolution accelerometer. The third accelerometer 17 has a first detection axis X and a second detection axis Y, both perpendicular to the optical axis OA. Furthermore, the first detection axis X is parallel to the first rotation axes R1 of the beams 20 of the first accelerometer 15, whereas the second detection Y is parallel to the second rotation axes R2 of the beams 20 of the second accelerometer 16. In practice, according to how it is oriented, the third accelerometer 17 is able to discriminate along which one of the first detection axis X and the second detection axis Y the force of gravity prevalently acts and is thus able to provide an indication of how the body 2, the optical axis OA, and the semiconductor chip 19, the relative positions whereof are constant, are oriented. An orientation signal $S_{XY}$, of a logic type, supplied by a sense interface (not illustrated in detail) of the third accelerometer 17 is sent to the pre-processing stage 18 (see FIG. 5).

Figure 14:
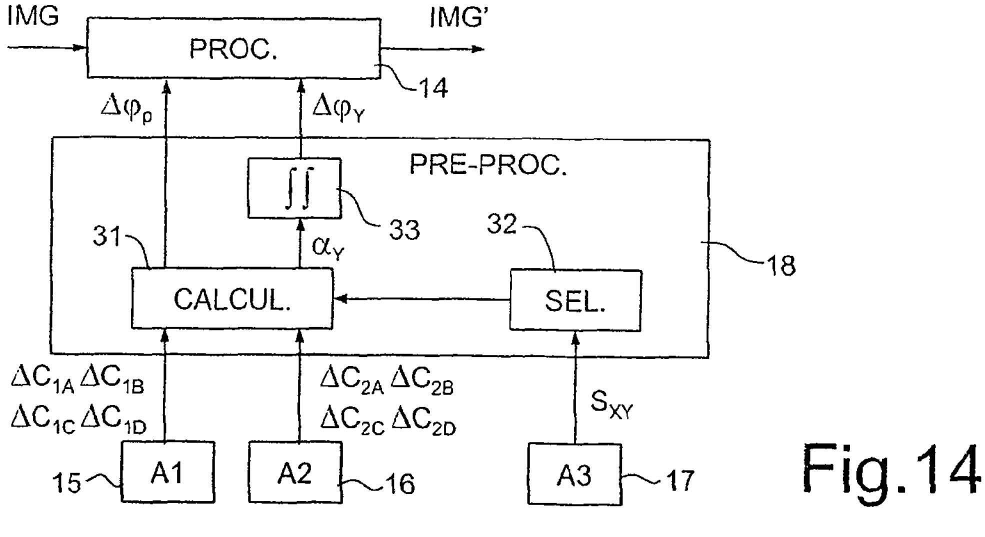
FIG. 14 is a more detailed block diagram of a first portion of the image stabilizer device of FIG. 5.

FIG. 14 shows in greater detail the pre-processing stage 18, which comprises a first computation module 31, a selector module 32, and an integrator module 33. The first computation module 31 is connected to the first accelerometer 15 and to the second accelerometer 16 for receiving sensing signals representing the capacitance variations $\Delta C_{1A}$, $\Delta C_{1B}$, $\Delta C_{1C}$, $\Delta C_{1D}$, $\Delta C_{2A}$, $\Delta C_{2B}$, $\Delta C_{2C}$, $\Delta C_{2D}$ of the respective first capacitors 27 and second capacitors 28 (see also FIGS. 7 and 12). The first computation module 31 is moreover configured to calculate the variations of the pitch angle $\Delta\phi_P$ and an acceleration of yaw $\alpha_Y$ on the basis of the capacitance variations $\Delta C_{1A}$, $\Delta C_{1B}$, $\Delta C_{1C}$, $\Delta C_{1D}$, $\Delta C_{2A}$, $\Delta C_{2B}$, $\Delta C_{2C}$, $\Delta C_{2D}$, selectively according to one of two modalities, according to whether the camera 1 is used in the "landscape" configuration or in the "portrait" configuration. The selection of the calculation mode is made by the selector module 32 on the basis of the orientation signal $S_{XY}$ supplied by the third accelerometer 17.

In practice, when the camera is in the "landscape" use configuration, the force of gravity acts prevalently on the second detection axis Y, and the orientation signal $S_{XY}$ has a first value. In this case, the first calculation mode of the first computation module 31 is selected, in which the first accelerometer 15 is used as inclinometer for measuring variations of the pitch angle $\Delta\phi_P$, and the second accelerometer 16 is used as rotational accelerometer for determining angular accelerations due to the variations of the yaw angle $\Delta\phi_Y$ (accelerations of yaw $\alpha_Y$; in this case, the yaw axis is parallel to the second detection axis Y). The calculation is carried out according to the equations:

$$\sin\Delta\varphi_P \cong \Delta\varphi_P = K_1[(\Delta C_{1A} - \Delta C_{1B}) + (\Delta C_{1D} - \Delta C_{1C})] \quad (1)$$

$$\alpha_Y = K_2[(\Delta C_{2A} - \Delta C_{2B}) - (\Delta C_{2D} - \Delta C_{2C})] \quad (2)$$

where $K_1$ and $K_2$ are coefficients of proportionality.

As regards Eq. (1), a movement of pitch of the camera 1 in the "landscape" configuration modifies the effect of the force of gravity on the first accelerometer 15 and is equivalent, in practice, to a linear acceleration AL directed perpendicularly to the surface 21*a* of the substrate 21 (as in the example of FIG. 9). Furthermore, the variation of the effect of the force of gravity is proportional to the sine of the variation in the pitch angle $\Delta\phi_P$. However, for small oscillations, as in the present application, the approximation $\sin\Delta\phi_P \cong \Delta\phi_P$ is justified. Alternatively, the first computation module 31 of FIG. 14 calculates the value of the function arcsin $\Delta\phi_P$. For the first accelerometer 15, Eq. (1) enables an amplification of the capacitive variation due to linear accelerations AL and the selective rejection of the effects of angular accelerations α due to rotations (in particular, following upon variations of the yaw angle $\Delta\phi_Y$) to be obtained. From FIG. 9, in which the effects of a linear acceleration AL are illustrated, from Eq. (1) we obtain $$\Delta\phi_P = K_1[(\Delta C-(-\Delta C))+(\Delta C-(-\Delta C))] = 4K_1\Delta C$$

In the case of angular accelerations α, illustrated in FIG. 10, we obtain instead:

$$\Delta\phi_P = K_1[(\Delta C-(-\Delta C))+(-\Delta C-\Delta C)] = 0$$

Instead, for the second accelerometer 16, Eq. (2) enables amplification of the effects of angular accelerations due to the accelerations of yaw $\alpha_Y$ and the selective rejection of linear accelerations perpendicular to the surface 21*a* of the substrate 21 to be obtained. Again, with reference to FIG. 10, from Eq. (2) we obtain $$\alpha_Y = K_2[(\Delta C-(-\Delta C))-(-\Delta C-\Delta C)] = 4K_2\Delta C$$

whereas, in the case of FIG. 9 (effect of linear accelerations AL), we have $$\alpha_Y = K_2[(\Delta C-(-\Delta C))-(\Delta C-(-\Delta C))] = 0$$

In practice then, the first accelerometer 15 senses only linear accelerations or forces having a component parallel to the optical axis OA and perpendicular to the second axis of detection Y (yaw axis) and is used as inclinometer for evaluating the variations of the pitch angle $\Delta\phi_P$. The second accelerometer 16 is selectively sensitive to the angular accelerations and is used as rotational accelerometer for determining the yaw accelerations $\alpha_Y$.

When the camera 1 is in the "portrait" configuration, the force of gravity acts prevalently along the first detection axis X of the third accelerometer 17, and the orientation signal $S_{XY}$ has a second value.

In this case, the second calculation mode of the first computation module 31 is selected, in which the second accelerometer 16 is used as inclinometer for measuring variations of the pitch angle $\Delta\phi_P$, and the first accelerometer 15 is used as rotational accelerometer for determining angular accelerations caused by the variations of the yaw angle $\Delta\phi_Y$ (yaw accelerations $\alpha_Y$; in this case, the yaw axis coincides with the first detection axis X). In practice, the second detection axis Y is substantially horizontal, as illustrated in FIG. 15. The calculation is carried out according to the following equations:

$$\sin\Delta\varphi_P \cong \Delta\varphi_P = K_2[(\Delta C_{2A} - \Delta C_{2B}) + (\Delta C_{2D} - \Delta C_{2C})] \quad (3)$$

$$\alpha_Y = K_1[(\Delta C_{1A} - \Delta C_{1B}) - (\Delta C_{1D} - \Delta C_{1C})] \quad (4)$$

In practice, the functions performed by the first and second accelerometers 15, 16 are swapped on the basis of the information supplied by the third accelerometer 17. Consequently, the first accelerometer 15 is selectively sensitive to the angular accelerations about the yaw axis (first detection axis X) and rejects the linear accelerations. Instead, the second accelerometer 16 selectively rejects the angular accelerations and reacts to the linear accelerations and to the forces having a component parallel to the optical axis and perpendicular to the first detection axis X.

Returning to FIG. 14, the values of the yaw acceleration $\alpha_Y$, determined by the first computation module 31, are supplied to the integrator module 33, which integrates them twice to trace back to the variations of the yaw angle $\Delta\phi_Y$.

Figure 16:
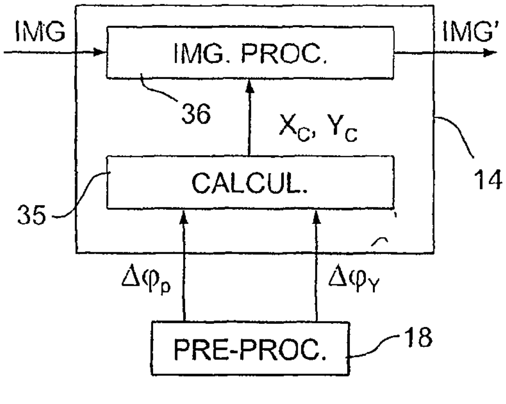
FIG. 16 is a more detailed block diagram of a second portion of the image-stabilizer device of FIG. 5.

FIG. 16 shows, in greater detail, the processing unit 14, which comprises a second computation module 35 and an image-processing module 36. The second computation module 35 receives from the pre-processing stage 18 the variations of the pitch angle $\Delta\phi_P$ and the variations of the yaw angle $\Delta\phi_Y$ and accordingly calculates compensated co-ordinates $X_C$, $Y_C$ of the usable frame 12 (FIG. 4*a*), so as to compensate for pitch and yaw movements and to stabilize the corresponding image. Stabilization is carried out according to criteria in themselves known.

The image-processing module 36 receives the first image signal IMG from the image sensor 5, and the compensated co-ordinates $X_C$, $Y_C$ of the usable frame 12 from the second computation module 35. On the basis of these compensated co-ordinates $X_C$, $Y_C$, the image-processing module 36 extracts the usable frame 12 from the complete image 11 (FIGS. 4*a* and 4*b*) and generates the second image signal IMG', stabilized.

The stabilizer device is mainly advantageous because accelerometers are used. Image stabilization can then be performed based on the detected movement, rather than on the content of the image itself, and, moreover, power absorption is minimal and in any case much lower than the consumption of stabilizer devices based on gyroscopes. Consequently, also the autonomy is improved, and the stabilizer device is particularly suited for being integrated in appliances for which power absorption is a critical factor, such as, for example, cellphones equipped with a camera. The stabilizer device described is moreover advantageous because the accelerometers used are simple and robust and, moreover, can be integrated in a single semiconductor chip. Also this feature renders the stabilizer device suitable for being incorporated within cellphones and other appliances of small dimensions.

Finally, it is evident that modifications and variations can be made to the stabilizer device described herein, without departing from the scope of the present invention. In particular, instead of oscillating-beam accelerometers, rotational accelerometers or linear accelerometers with comb-fingered electrodes may be used. In the first case, two rotational accelerometers with rotation axes perpendicular to one another and to the optical axis are sufficient. In the second case, two pairs of linear accelerometers with comb-fingered electrodes are necessary, arranged so as to differentially react to the accelerations directed along two axes perpendicular to one another and to the optical axis.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stabilizer device of images acquired by a digital-image sensor, the stabilizer device comprising:

a processing unit, connectable to said digital-image sensor for receiving a first image signal and configured to produce a second image signal from said first image signal based on quantities correlated to pitch and yaw movements of said digital-image sensor; and a motion sensor structured to detect the quantities correlated to pitch and yaw movements of said digital-image sensor, the motion sensor including:

first and second accelerometers structured to detect the quantities correlated to pitch and yaw movements of said digital-image sensor;

a third accelerometer configured to provide an orientation signal; and a pre-processing stage coupled to said first accelerometer and to said second accelerometer for receiving sensing signals representing said differential capacitive unbalancing, and configured to determine said quantities based on said differential capacitive unbalancing using selectively one of a first mode and a second mode, based on the orientation signal provided by said third accelerometer, wherein:

in said first mode, said pre-processing stage is configured to determine said quantities so as to reject angular accelerations acting on said first accelerometer and linear accelerations acting on said second accelerometer, and in said second mode, said pre-processing stage is configured to determine said quantities so as to reject linear accelerations acting on said first accelerometer and angular accelerations acting on said second accelerometer.

2. The device according to claim 1 wherein said first accelerometer and said second accelerometer are oscillating-beam MEMS accelerometers.

3. The device according to claim 2 wherein said first accelerometer comprises two respective beams constrained so as to oscillate about respective first rotation axes, parallel to one another and staggered with respect to centroids of said beams of said first accelerometer.

4. The device according to claim 3 wherein said second accelerometer comprises two respective beams constrained so as to oscillate about respective second rotation axes perpendicular to said first rotation axes and staggered with respect to centroids of said beams of said second accelerometer.

5. The device according to claim 4 wherein each of the first and second accelerometers includes first and second electrodes capacitively coupled to a first one of said beams of said accelerometer and third and fourth electrodes capacitively coupled to a second one of said beams of said accelerometer, so that oscillations of said beams of said accelerometer cause differential capacitive unbalancing between said beams and said electrodes.

6. The device according to claim 5, wherein the third accelerometer is a biaxial accelerometer having a first detection axis, parallel to said first rotation axes of the beams of said first accelerometer, and a second detection axis parallel to said second rotation axes of the beams of said second accelerometer.

7. The device according to claim 6 wherein said first accelerometer, said second accelerometer, and said third accelerometer are integrated in a single semiconductor chip.

8. The device according to claim 6 wherein said orientation signal has a first value when said third accelerometer is oriented so that gravity acts prevalently along said first detection axis, and a second value when said third accelerometer is oriented so that gravity acts prevalently along said second detection axis.

9. The device according to claim 5 wherein, in said first mode, said pre-processing stage is configured to determine a first quantity $\Delta\phi_P$ and a second quantity $\alpha_Y$, respectively, according to the equations:

$$\Delta\phi_P = K_1[(\Delta C_{1A} - \Delta C_{1B})) + (\Delta C_{1D} - C_{1C})]$$

$$\alpha_Y = K_2[(\Delta C_{2A} - \Delta C_{2B})) + (\Delta C_{2D} - C_{2C})]$$

where:

$K_1$ and $K_2$ are two constants;

$\Delta C_{1A}$ and $\Delta C_{1B}$ are the capacitive variations between the first beam of said first accelerometer and the first and second electrodes, respectively, of said first accelerometer;

$\Delta C_{1C}$ and $\Delta C_{1D}$ are the capacitive variations between the second beam of said first accelerometer and the third and fourth electrodes, respectively, of said first accelerometer;

$\Delta C_{2A}$ and $\Delta C_{2B}$ are the capacitive variations between the first beam of said second accelerometer and the first and second electrodes, respectively, of said second accelerometer; and $\Delta C_{2C}$ and $\Delta C_{2D}$ are the capacitive variations between the second beam of said second accelerometer and the third and fourth electrodes, respectively, of said second accelerometer.

10. The device according to claim 9 wherein, in said second mode, said pre-processing stage is configured to determine said first quantity $\Delta\phi_P$ and said second quantity $\alpha_Y$, respectively, according to the following equations:

$$\Delta\phi_P = K_2[(\Delta C_{2A} - \Delta C_{2B})) + (\Delta C_{2D} - C_{2C})]$$

$$\alpha_Y = K_1[(\Delta C_{1A} - \Delta C_{1B})) + (\Delta C_{1D} - C_{2C})].$$

11. The device according to claim 1 wherein the quantities correlated to pitch and yaw movements of said digital-image sensor comprise a variation of pitch angle, an acceleration of yaw, and a variation of yaw angle.

12. A digital image acquisition apparatus, comprising:

a digital-image sensor; and an image stabilizer device that includes:

a processing unit coupled to said digital-image sensor for receiving a first image signal and configured to produce a second image signal from said first image signal based on quantities correlated to pitch and yaw movements of said digital-image sensor; and a motion sensor structured to detect the quantities correlated to pitch and yaw movements of said digital-image sensor, the motion sensor including;

first and second accelerometers structured to detect the quantities correlated to pitch and yaw movements of said digital-image sensor;

a third accelerometer configured to provide an orientation signal; and a pre-processing stage coupled to said first accelerometer and to said second accelerometer for receiving sensing signals representing said differential capacitive unbalancing, and configured to determine said quantities based on said differential capacitive unbalancing using selectively one of a first mode and a second mode, based on the orientation signal provided by said third accelerometer, wherein:

in said first mode, said pre-processing stage is configured to determine said quantities so as to reject angular accelerations acting on said first accelerometer and linear accelerations acting on said second accelerometer, and in said second mode, said pre-processing stage is configured to determine said quantities so as to reject linear accelerations acting on said first accelerometer and angular accelerations acting on said second accelerometer.

13. The apparatus according to claim 12 wherein:

said first accelerometer comprises two respective beams constrained so as to oscillate about respective first rotation axes, parallel to one another and staggered with respect to centroids of said beams of said first accelerometer; and said second accelerometer comprises two respective beams constrained so as to oscillate about respective second rotation axes perpendicular to said first rotation axes and staggered with respect to centroids of said beams of said second accelerometer.

14. The apparatus according to claim 13, wherein the third accelerometer is a biaxial accelerometer having a first detection axis, parallel to said first rotation axes of the beams of said first accelerometer, and a second detection axis parallel to said second rotation axes of the beams of said second accelerometer.

15. The apparatus according to claim 14 wherein said orientation signal has a first value when said third accelerometer is oriented so that gravity acts prevalently along said first detection axis, and a second value when said third accelerometer is oriented so that gravity acts prevalently along said second detection axis.

16. The apparatus according to claim 13 wherein each of the first and second accelerometers includes first and second electrodes capacitively coupled to a first one of said beams of said accelerometer and third and fourth electrodes capacitively coupled to a second one of said beams of said accelerometer, so that oscillations of said beams of said accelerometer cause differential capacitive unbalancing between said beams and said electrodes.

17. A stabilizer device of images acquired by a digital-image sensor, the stabilizer device comprising:

a processing unit, connectable to said digital-image sensor for receiving a first image signal and configured to produce a second image signal from said first image signal based on quantities correlated to pitch and yaw movements of said digital-image sensor;

a motion sensor structured to detect the quantities correlated to pitch and yaw movements of said digital-image sensor, the motion sensor including first and second accelerometers structured to detect the quantities correlated to pitch and yaw movements of said digital-image sensor, and a biaxial third accelerometer structured to provide an orientation signal indicative of an orientation of the stabilizer device; and a pre-processor coupled between the motion sensor and the processing unit, the pre-processor being structured to select one of a first processing mode and a second processing mode based on the orientation signal supplied by said third accelerometer, wherein, in said first processing mode, said pre-processing stage is configured to determine said quantities so as to reject angular accelerations acting on said first accelerometer and linear accelerations acting on said second accelerometer, and wherein, in said second mode, said pre-processing stage is configured to determine said quantities so as to reject linear accelerations acting on said first accelerometer and angular accelerations acting on said second accelerometer.

18. The device according to claim 17 wherein:

said first accelerometer comprises two respective beams constrained so as to oscillate about respective first rotation axes, parallel to one another and staggered with respect to centroids of said beams of said first accelerometer; and said second accelerometer comprises two respective beams constrained so as to oscillate about respective second rotation axes perpendicular to said first rotation axes and staggered with respect to centroids of said beams of said second accelerometer.

19. The device according to claim 18, wherein the biaxial third accelerometer has a first detection axis, parallel to said first rotation axes of the beams of said first accelerometer, and a second detection axis parallel to said second rotation axes of the beams of said second accelerometer.

20. The device according to claim 18 wherein each of the first and second accelerometers includes first and second electrodes capacitively coupled to a first one of said beams of said accelerometer and third and fourth electrodes capacitively coupled to a second one of said beams of said accelerometer, so that oscillations of said beams of said accelerometer cause differential capacitive unbalancing between said beams and said electrodes.

21. The device according to claim 20 wherein said pre-processor is coupled to said first accelerometer and to said second accelerometer for receiving sensing signals representing said differential capacitive unbalancing, and is configured for determining said quantities based on said differential capacitive unbalancing.

22. The apparatus according to claim 17 wherein said orientation signal has a first value when said third accelerometer is oriented so that gravity acts prevalently along a first axis of detection, and a second value when said third accelerometer is oriented so that gravity acts prevalently along a second axis of detection.

* * * * *

UNITED STATES PATENT AND TRADEMARK OFFICE

CERTIFICATE OF CORRECTION

PATENT NO. : 8,022,996 B2
APPLICATION NO. : 12/048756
DATED : September 20, 2011
INVENTOR(S) : Pasolini et al.

It is certified that error appears in the above-identified patent and that said Letters Patent is hereby corrected as shown below:

Column 9

Claim 9, Line 29, " $\Delta\phi_P=K_1[(\Delta C_{1A}-\Delta C_{1B}))+(\Delta C_{1D}-C_{1C})]$ " should read as,
-- $\Delta\phi_P = K_1[(\Delta C_{1A} - \Delta C_{1B}) + (\Delta C_{1D} - \Delta C_{1C})]$ --.

Column 9

Claim 9, Line 31, " $\alpha_Y=K_2[(\Delta C_{2A}-\Delta C_{2B}))+(\Delta C_{2D}-C_{2C})]$ " should read as,
-- $\alpha_Y = K_2[(\Delta C_{2A} - \Delta C_{2B}) - (\Delta C_{2D} - \Delta C_{2C})]$ --.

Column 9

Claim 10, Line 55, " $\Delta\phi_P=K_2[(\Delta C_{2A}-\Delta C_{2B}))+(\Delta C_{2D}-C_{2C})]$ " should read as,
-- $\Delta\phi_P = K_2[(\Delta C_{2A} - \Delta C_{2B}) + (\Delta C_{2D} - \Delta C_{2C})]$ --.

Column 9

Claim 10, Line 57, " $\alpha_Y=K_1[(\Delta C_{1A}-\Delta C_{1B}))+(\Delta C_{1D}-C_{2C})]$." should read as,
-- $\alpha_Y = K_1[(\Delta C_{1A} - \Delta C_{1B}) - (\Delta C_{1D} - \Delta C_{1C})]$ .--.

Signed and Sealed this
Tenth Day of January, 2012

David J. Kappos
*Director of the United States Patent and Trademark Office*